(12) United States Patent
Miyamoto

(10) Patent No.: US 7,895,887 B2
(45) Date of Patent: Mar. 1, 2011

(54) METHOD AND APPARATUS FOR COAXIALLY ALIGNING TIRE WITH SUPPORT RIMS

(75) Inventor: Kazuyuki Miyamoto, Nasushiobara (JP)

(73) Assignee: Bridgestone Corporation, Tokyo (JP)

( * ) Notice: Subject to any disclaimer, the term of this patent is extended or adjusted under 35 U.S.C. 154(b) by 158 days.

(21) Appl. No.: 12/227,125

(22) PCT Filed: May 11, 2007

(86) PCT No.: PCT/JP2007/059769
§ 371 (c)(1),
(2), (4) Date: Nov. 7, 2008

(87) PCT Pub. No.: WO2007/145043
PCT Pub. Date: Dec. 21, 2007

(65) Prior Publication Data
US 2009/0173452 A1 Jul. 9, 2009

(30) Foreign Application Priority Data
Jun. 16, 2006 (JP) .............................. 2006-167249

(51) Int. Cl.
*G01M 17/02* (2006.01)
(52) U.S. Cl. ....................................................... 73/146
(58) Field of Classification Search .................. None
See application file for complete search history.

(56) References Cited

U.S. PATENT DOCUMENTS 3,609,813 A * 10/1971 MacMillan ................... 425/19

2007/0000616 A1 * 1/2007 Rogalla et al. ................ 157/1.1
2007/0215266 A1 * 9/2007 Shimizu et al. ............. 156/112

FOREIGN PATENT DOCUMENTS

| EP | 0 626 253 A2 | 11/1994 |
|---|---|---|
| EP | 0 626 253 A3 | 11/1994 |
| JP | A 4-341835 | 11/1992 |
| JP | A 7-117152 | 5/1995 |
| JP | A-7-125513 | 5/1995 |
| JP | A 9-11716 | 1/1997 |
| JP | A 9-58231 | 3/1997 |
| JP | A 9-126935 | 5/1997 |
| JP | B2 3406031 | 5/2003 |
| JP | A 2006-208245 | 8/2006 |
| JP | A 2007-98935 | 4/2007 |

OTHER PUBLICATIONS

European Patent Office, *European Search Report* for EP 07 74 3204, dated Jun. 7, 2010, pp. 1-5.

* cited by examiner

*Primary Examiner*—Andre J Allen
(74) *Attorney, Agent, or Firm*—Oliff & Berridge PLC

(57) ABSTRACT

The present invention aims to coaxially aligning a tire with support rims with high accuracy by eliminating an effect of a tread outer surface.

A radial inner end position of the bead portion of the tire his detected by a photoelectric sensor at circumferentially separated four points, and a deviation between the central axis of the tire and the central axis of a pair of support rims. The bead portion of the tire, which is an subject of the detection of the inner end position, is a portion where its dimension and shape are hardly changed even if the tire runs (i.e., is used) for a long time, so that the above-mentioned deviation can be determined at a high accuracy to, thereby, conduct a center alignment of the tire with the support rims at a high accuracy.

10 Claims, 3 Drawing Sheets

METHOD AND APPARATUS FOR COAXIALLY ALIGNING TIRE WITH SUPPORT RIMS

FIELD OF THE INVENTION

The present invention relates to a method and an apparatus for coaxially aligning a tire with a pair of support rims movable in mutually approaching and receding directions on which the tire is to be mounted.

RELATED ART

As a method and an apparatus for coaxially aligning a tire with the above-mentioned type of support rims, conventionally known are an invention described in Japanese Patent No. 3406031.

The apparatus has a horizontal elevating stage, a vertical fluid cylinder for lifting/lowering the elevating stage, a pair of horizontal long rolls separately arranged on the elevating stage with a given distance therebetween, the rolls aligning, in the longitudinal direction, the central axis of the tire with the central axis of the support rim movable in mutually approaching and receding directions on which the tire is to be mounted when the tire is placed on the rolls in the upright state, upper and lower detector for detecting upper and lower ends of a bead portion in the radial direction when the elevating stage and the tire are lifted/lowered by the fluid cylinder, and a calculating device for calculating the amount of lifting/lowering necessary for aligning the central axis of the tire with the central axis of the support rim in the vertical direction. The apparatus is also designed to align the central axis of the tire with the central axis of the support rim in the longitudinal direction by operating the fluid cylinder with a move signal from the calculation device to lift/lower the elevating stage and tire with the above-mentioned amount of lifting/lowering.

DISCLOSURE OF THE INVENTION

Such a conventional method and apparatus for coaxially aligning a tire with support rims align, in the longitudinal direction, the central axis of the tire with the central axis of the support rims by bringing the outer surface (grounding surface) of the tread portion of the tire into contact with the pair of the long roll. Thus, when the tire is a used tire subjected to be retreaded and has uneven wear, deformation, partial defect or the like on the tread outer surface, the center alignment in the longitudinal direction is affected and deviated by such uneven wear, deformation, partial defect of the like, which causes a problem.

The object of the present invention is to provide a method and apparatus capable of coaxially aligning a tire with support rims with high accuracy by eliminating an effect of a tread outer surface.

This object can be achieved by, firstly, a method for coaxially aligning a tire with support rims comprising the steps of: detecting a position of a radial inner end of a bead portion of the tire with a detecting means at three or more points separated in the circumferential direction; calculating a positional difference between a central axis of the tire and a central axis of a pair of support rims movable in mutually approaching and receding directions by a processing means on the basis of positional information of the detecting means and a result from the detecting means at the detecting step; and aligning the central axis of the tire with the central axis of the support rims by operating a moving means upon receiving a matching signal from the processing means to move the tire through a distance equal to the calculated positional difference.

The object can be achieved by, secondary, an apparatus for coaxially aligning a tire with support rims comprising a detecting means for detecting a position of a radial inner end of a bead portion of the tire at least at three points separated in the circumferential direction; a processing means for calculating a positional difference between a central axis of the tire and a central axis of a pair of support rims movable in mutually approaching and receding directions on the basis of positional information of the detecting means and a result from the detecting means at the detection; and a moving means for aligning the central axis of the tire with the central axis of the support rims operable upon receiving a matching signal from the processing means to move the tire through a distance equal to the calculated positional difference.

In this invention, the position of the radial inner end of the bead portion of the tire is detected by the detecting means at least at three points separated in the circumferential direction and the positional difference between the central axis of the tire and the central axis of a pair of the support rim is calculated on the basis of the result of the detection and the positional information of the detecting means. The bead portion of the tire, which is subjected to the detection of the position of the inner end, is a portion where its dimension and shape are hardly changed even if the tire runs (i.e., is used) for a long time, so that the above-mentioned difference can be determined at a high accuracy to, thereby, conduct a center alignment of the tire with the support rim at a high accuracy. In this way, the present invention utilizes not the outer surface of the tread but the bead portion for the center alignment. Thus, even if there is uneven wear, deformation, partial defect or the like on the tread, the effect can be certainly eliminated.

In the present invention configured according to the disclosure of claim 2, even when the case where the shape of the radial inner end of the bead portion is not a perfect circle but is deformed in an axisymmetric shape such as an ellipse, a difference between its central axis (an intersection of the long axis and the short axis) and the central axis of the support rims can be determined at a high accuracy to, thereby, conduct the center alignment with the support rims at a high accuracy. In the apparatus configured according to the disclosure of claim 4, the radial inner end of the bead core can be detected by the detecting means without largely moving the detecting means of the tire, which improves operating efficiency.

When the moving means for moving the tire for the center alignment is also used for detecting the radial inner end of the bead portion as recited in claim 5, a special moving means for position detection is not needed. This can simplify the configuration and decrease the production cost of the apparatus. Further, the present invention is suitable for a buffing machine as recited in claim 6.

Figure 1:
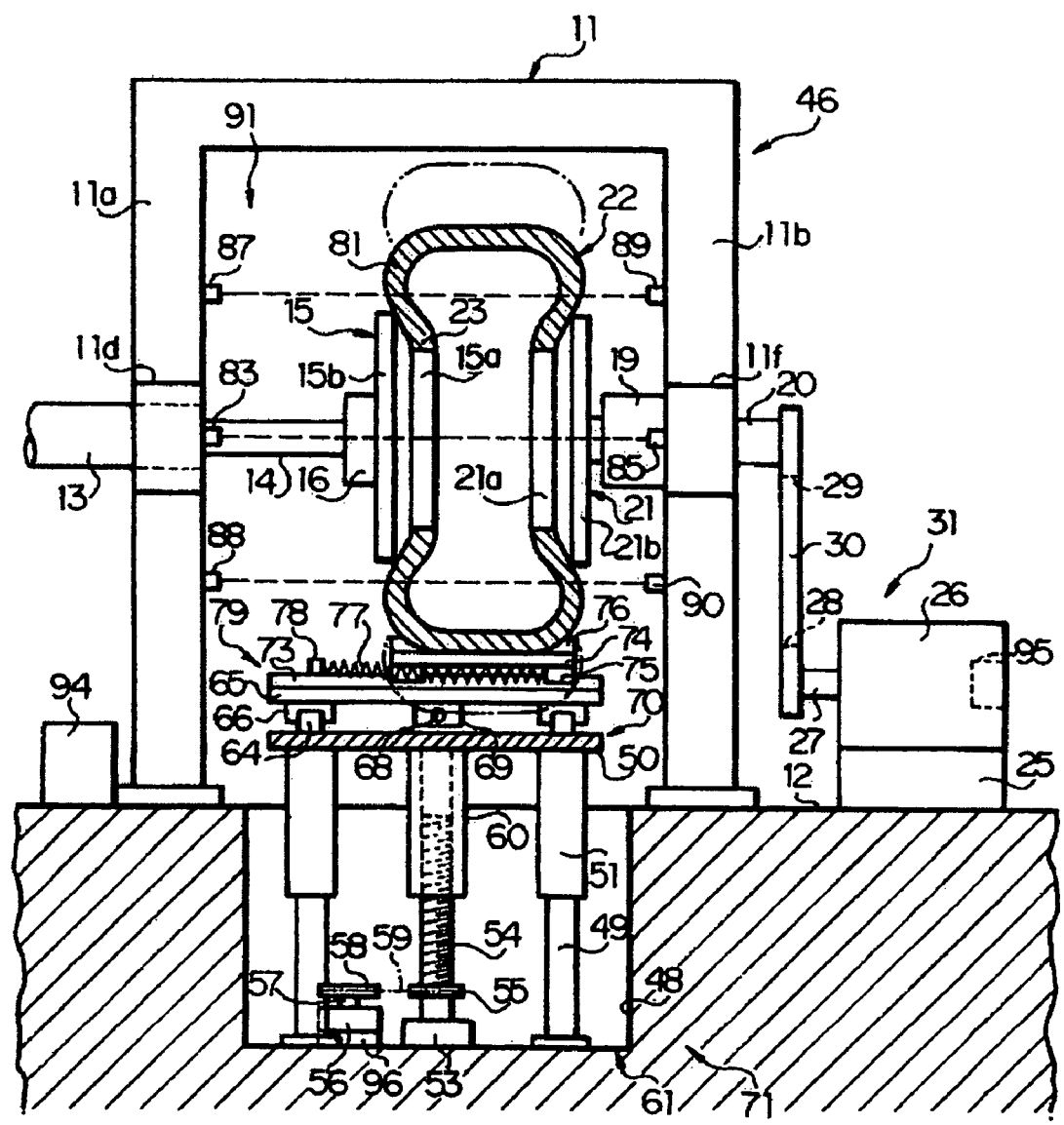
FIG. 1 is a front sectional view of an embodiment of the present invention.

REFERENCE SYMBOLS 15, 21 support rim
22 tire
23 bead portion 46 buffing machine
71 moving means
91 detecting means
94 processing means

BEST MODE FOR CARRYING OUT THE INVENTION

Figure 2:
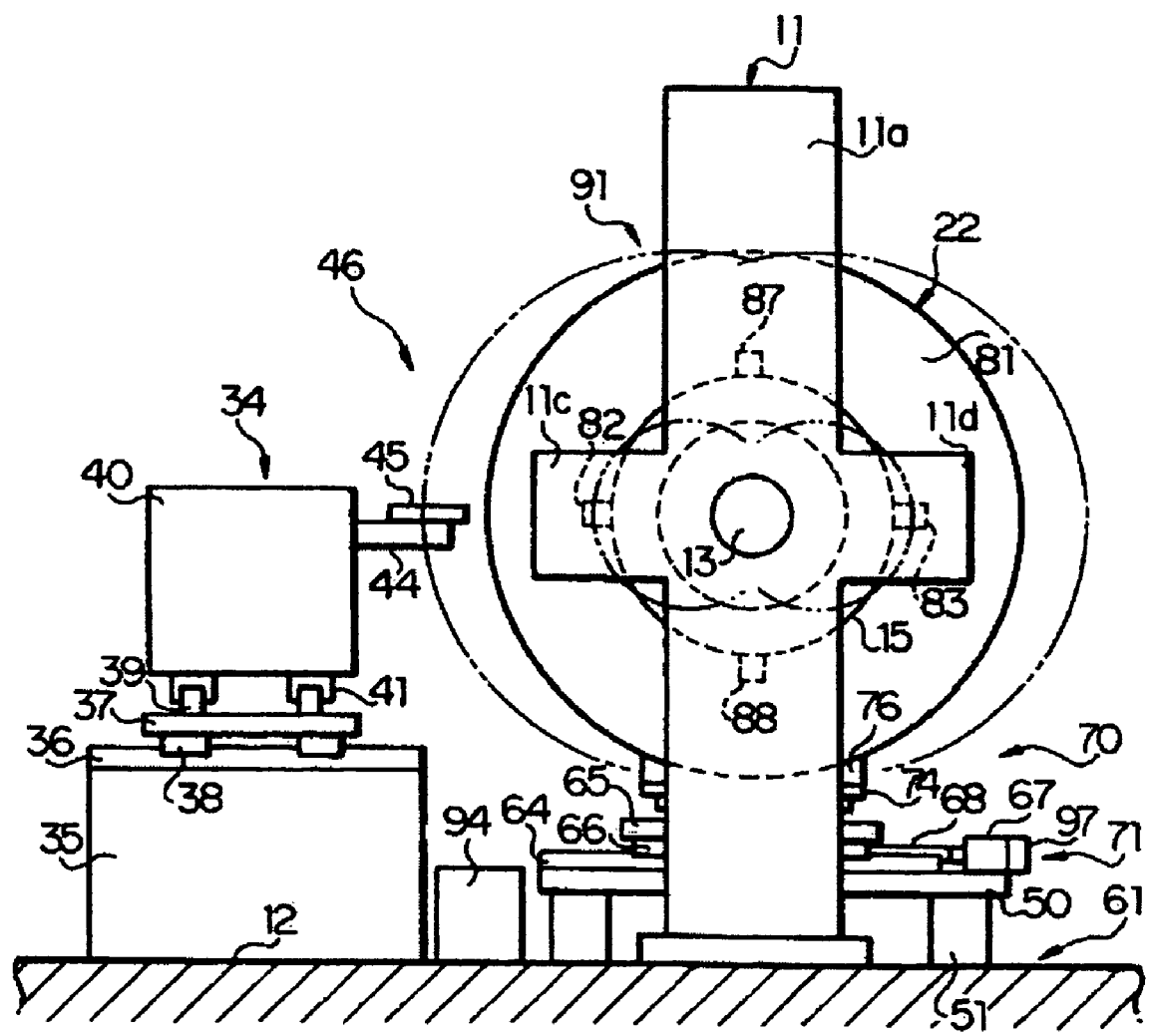
FIG. 2 is a left side view of the embodiment shown in FIG. 1.
Figure 3:
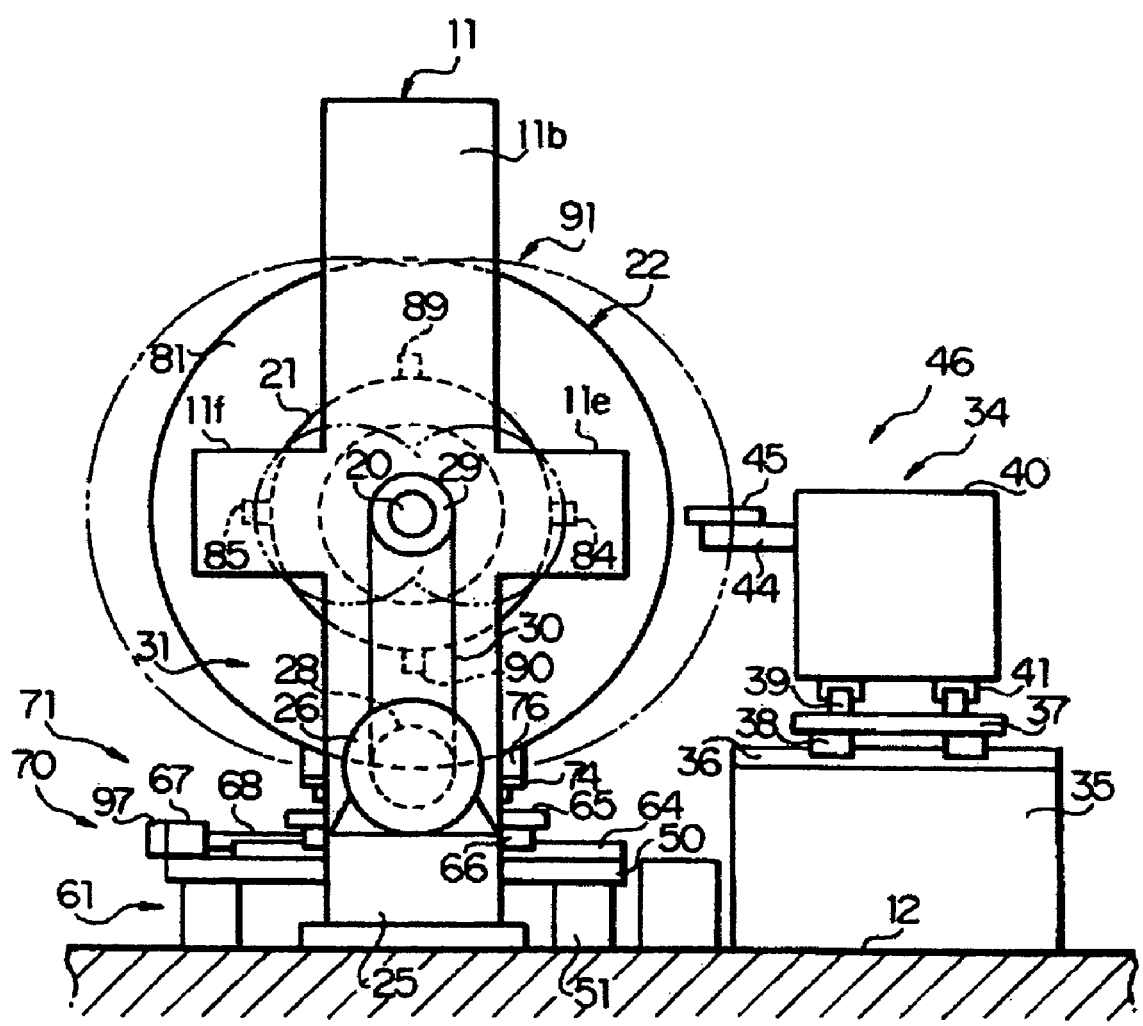
FIG. 3 is a right side view of the embodiment shown in FIG. 1.

In the next, embodiments of the present invention are discussed with reference to the drawings. In FIGS. 1, 2 and 3, the reference numeral 11 denotes a gate-type support flame vertically arranged on a floor face 12. On the heightwise central portion of a vertical portion 11a located at one side of the support flame 11, there is provided a cylinder 13 horizontally extending toward a vertical portion 11b located at the other side as an approaching/receding means. The axially other end (leading end) of a piston rod 14 of the cylinder 13 is inserted in a bearing 16 fixed at one side of a support rim 15. As a result, the support rim 15 is rotatably supported by the support flame 11 via the bearing 16 and cylinder 13.

Meanwhile, a bearing 19 is fixed on one side of the heightwise central portion of the vertical portion 11b, and an axial central portion of a rotating shaft 20 which is coaxial with the cylinder and limited its axial movement is inserted in the bearing 19. At one axial end of the rotating shaft 20, the other support rim 21 which makes a pair with the support rim 15 is fixed. As a result, the support rim 21 is rotatably supported by the support rim 11 via the bearing 19 and the rotating shaft 20.

When the cylinder 13 operates to project or retract the piston rod 14, the support rim 15 alone is moved while the support rim 21 is laid still. Accordingly, a pair of the support rims 15 and 21 approach/recede with each other along the below-mentioned central axis of the tire. It is noted that the one support rim 15 may be laid still while only the other support rim 21 is moved, or, alternatively, both of the support rims 15 and 21 may be moved. In other words, at least one of the support rims 15 and 21 approaches/recedes with each other along the central axis of the tire.

Moreover, the support rims 15 and 21 each consists of a bead seat portion 15a, 21a, respectively, having a generally cylindrical shape and a flange portion 15b, 21b, respectively, extending from the axial outer end of the bead seat portion 15a, 21a and having larger diameter than that of the bead seat 15a, 21a. When a tire 22 (in this case, a used tire subjected to be retreaded) is mounted on the support rims 15, 21, bead portions 23 of the tire 22 are seated on the outer circumferential surfaces of the bead seat portions 15a, 21a, and the inner circumferential surfaces of the bead portions contact the outer circumferential surfaces of the bead seat portions 15a, 21a.

A base 25 and a driving motor 26 are arranged on the floor face 12 at the other side with respect to the vertical portion 11b. A timing belt 30 is pulled between a pulley 28 fixed to an output shaft 27 of the driving motor 26 and a pulley 29 fixed to the rotating shaft 20. As a result, when the driving motor 26 is operated to rotate the output shaft 27, the support rims 15, 21 and the tire mounted thereon are integrally rotated. The above-mentioned rotating shaft 20, driving motor 26, pulleys 28, 29 and timing belt 30 are, as a whole, constitute a rotating means 31 for rotating the support rims 15, 21 and tire 22 with respect to the central axis of the support rims 15, 21 when the tread rubber is removed.

A buffing means 34 is provided in front of the support flame 11 and has a base arranged on the floor face 12 and a pair of guide rails 36 laid on the base 35 and extending in the longitudinal direction. A slide bearing 38 fixed to a moving plate 37 is slidably engaged with the guide rails. A pair of guide rails 39 extending parallel to the cylinder 13 is also laid on the moving plate 37. A slide bearing 41 fixed to a buffing body is slidably engaged with the guide rails.

When a driving force is applied from a not-shown driving mechanism such as a screw mechanism, the moving plate 37 and the buffing body 40 are moved in the radial and width directions, respectively, to enable the buffing body 40 to move along the outer surface of the tire 22 in a horizontal plane. The reference numeral 44 denotes an arm supported by the buffing body 40 and a buffing rotation body 40 of a grinding type is rotatably supported at the leading end of the arm 44.

As a result, when the tire 22 supported by the support rims 15, 21 is rotated by the driving force applied from the rotating means 31, the buffing rotation body 45 moves along the outer surface of the tire in a horizontal plane while rotating, and the tread rubber is removed from the tire 22 to reform the tire 22 as a base tire. The above-mentioned base 35, guide rails 36, 39, moving plate 37, slide bearings 38, 41, buffing body 40, arm 44 and buffing rotation body 45, as a whole, constitute the above-mentioned buffing means 34, and the above-mentioned support flame 11, cylinder 13, support rims 15, 21, bearings 16, 19, rotating means 31 and buffing means 34, as a whole, constitute a buffing machine 46 for removing the tread rubber from the tire (used tire subjected to be retreaded) 22. Such buffing machine 45 is suitable for the present invention.

The reference numeral 48 denotes a pit dug down in the floor face 12 immediately below the support rims 15, 21. A plurality of guide posts 49 extending in the vertical direction are vertically arranged on the bottom face of the pit 48 and slidably inserted in cylindrical guide tubes 51 fixed to the lower side of a horizontal elevating plate 50. The reference numeral 53 denotes a bearing fixed to the bottom face of the pit 48 and a lower end portion of a screw shaft 54 extending in the vertical direction is rotatably supported by the bearing 53.

A timing belt 59 is pulled between a pulley 55 fixed to the screw shaft 54 and a pulley 58 fixed to a rotating shaft 57 of a driving motor 56 placed on the bottom face of the pit 48. The upper end portion of the screw shaft 54 is screwed into a threaded member 60 fixed to the lower side of the elevating plate 50. When the driving motor 56 is operated to rotate the screw shaft 54, the elevating plate 50 moves up and down with a guide of the guide posts 49 and the guide tubes 51. The above-mentioned guide posts 49, elevating plate 50, guide tubes 51, bearing 53, screw shaft 54, pulleys 55, 58, driving motor 56, timing belt 59 and threaded member, as a whole, constitute a elevating mechanism 61 moving up and down while carrying the tire 22.

A pair of guide rails 64 extending in the longitudinal direction are laid on the upper side of the elevating plate 50, and a plurality of slide bearings 66 mounted on the lower side of a moving plate 65 placed immediately above the elevating plate 50 are slidably engaged with the guide rails 64. The reference numeral 67 denotes a driving motor fixed to the upper face of the rear end of the elevating plate 50. A screw shaft 68 connected to the output shaft of the driving motor 67 and extending in the longitudinal direction is screwed into a threaded member 69 attached to the lower side of the central portion of the moving plate 65.

As a result, when the driving motor 67 is operated to rotate the screw shaft 68, the moving plate 65 moves in the longitudinal direction with a guide of the guide rails 64. The above-mentioned guide rails 64, moving plate 65, slide bearing 66, driving motor 67, screw shaft 68 and threaded member 69, as a whole, constitute a driving mechanism 70 moving in the longitudinal direction while carrying the tire 22. The above-mentioned elevating mechanism 61 and driving mechanism 70 constitute a moving means 71 as a whole. It is noted that the screw mechanism is used as a moving means 71 in this embodiment, but a rack-and-pinion mechanism, hydraulic servo cylinder or the like may be used for the present invention.

The reference numeral 73 denotes a pair of guide rails laid on the upper side of the moving plate 65 and extending parallel to the central axes of the support rims 15, 21. A plurality of slide bearings 75 attached to the lower side of a guide plate 74 placed immediately above the moving plate 65 are slidably engaged with the guide rails 73. As a result, the guide plate 74 can move along the central axis of the support rims 15, 21 with a guide of the guide rails 73. On the upper side of the guide plate 74, there is provided a tire receiver 76 for preventing a rotational movement of the tire 22 when the tire 22 is placed on it in the upright state.

The reference numeral 77 denotes a tension spring latched onto a stopper 78 fixed to the moving plate 65 at its one end. The other end of the spring 77 is latched onto the guide plate 74. The guide plate is subjected to a biasing force from the spring 77 to be displaced in axially first direction along the central axis of the support rims 15, 21 until it reaches a carry-in-and-out position abutting on the stopper 78. The above-mentioned guide rails 73, guide plate 74, slide bearing 75, spring 77 and stopper 78, as a whole, constitute a guide mechanism 79 capable of guiding the tire 22 in the upright state in the axially opposite direction while preventing a displacement in the radial direction.

The reference numerals 11c and 11d denote arm portion horizontally extending forward and backward, respectively, from the central portion in the height direction. Optical transmitters 82 and 83 emitting light parallel to the central axis of the support rims 15, 21 in the axially opposite direction are provided on the axially opposite side of the arm portions 11c, 11d at the same height as that of the central axis of the support rims 15, 21. In this state, a path of the light emitted from the optical transmitters 82 and 83 lies slightly outside of the outer edge of flange portions 15b and 21b of the support rims 15 and 21, respectively, in the radial direction, so that the light is not blocked by the flange portions 15b and 21b. Meanwhile, arm portions 11e and 11f are provided on a vertical portion 11b in the same way of the vertical portion 11a. Optical receivers 84 and 84 for receiving the light from the optical transmitters 82 and 83, respectively, are attached on the axially first sides of the arm portions 11e and 11f, respectively, at the positions intersecting with the light from the optical transmitters 82 and 83.

The light from the optical transmitters 82 or 83 is blocked by a sidewall portion 81 of the tire 22 when the central axis of the tire 22 supported in the upright state from underneath by the guide mechanism 79 and the moving means 71 locates near the central axis of the support rims 15, 21. The light, however, is released from the blocking and reaches the optical receivers 84 or 85 when the moving means 71 is operated to move the tire 22 forward or backward in a plane perpendicular to the central axis of the tire until the radial inner end, or the bead toe in this embodiment, of the bead portion 23 passes through and gets out of the path of the light. In this way, the radial inner end positions of the bead portion 23 of the tire 22 are detected at two points as a front end and a rear end which are circumferentially spaced by 180 degrees.

Meanwhile, optical transmitter 87 and 88 are attached to the axially opposite side of the vertical portion 11a at slightly above and below, respectively, the central axis of the support rims 15, 21. The distances from the optical transmitters 87, 88 and optical receivers 82, 83 to the central axis of the support rims 15, 21 are the same. When light parallel to the light from the optical transmitters 82, 83 is emitted from the optical transmitters 87, 88 in the axially opposite direction, these lights can be received by the optical receivers 89, 90 attached on the axially first side of the vertical portion 11b at the positions intersecting with the emitted light.

In the same manner in the above, the light from the optical transmitters 87, 88 is blocked by the sidewall portion 81 when the central axis of the tire 22 locates near the central axis of the support rims 15, 21, but the light is released from the blocking and reaches the optical receivers 89, 90 when the tire 22 moves upward or downward in a plane perpendicular to the central axis of the tire until the radial inner end of the bead portion 23 passes through and gets out of the path of the light. This leads the radial inner end positions of the bead portion 23 to be detected at two points as a front end and a rear end which are circumferentially spaced by 180 degrees.

The above-mentioned pairs of the optical transmitter and receiver 82 and 84, 83 and 85, 87 and 89, 88 and 90 constitute photoelectric sensors 91 of the transmission type, and these four photoelectric sensors 91 detect the radial inner end position of the bead portion 23 of the tire 22 at four points which are circumferentially spaced by a equal angle (90 degrees). In this way, the photoelectric sensors (detecting means) 91 of the same number as the radial inner end positions of the bead portion 23 to be detected can detect the radial inner end positions of the bead portion 23 without largely moving the photoelectric sensors 91 and the tire 22, as compared with the case where only one photoelectric sensor is provided, to improve the operating efficiency.

The radial inner end positions of the bead portions 23 are detected by the photoelectric sensors 91 at four points circumferentially spaced by an equal angle in this embodiment. It is noted, however, that the radial inner points to be detected by the detecting means may be circumferentially separated by different angles and may be at least three points in the present invention. The reason why the radial inner end positions to be detected should be at least three points is that the circle formed by the radial inner end of the bead portion 3 and the center point of the circle may be easily and accurately computed with these at least three points.

Although the photoelectric sensor 91 of the transmission type is used as a detecting means for detecting the radial inner end position of the bead portion 23 in the above-described embodiment, a photoelectric sensor of the reflection type or a micro switch may also be used in the present invention. In addition, the bead portion may be captured by an image pickup tube, and the image may be processed to detect the radial inner end of the bead portion.

When the radial inner end positions of the bead portion 23 are detected by the photoelectric sensor (detecting means) 91 at four points circumferentially spaced by 90 degrees, even if the shape of the radial inner end of the bead portion 23 is not a perfect circle but is deform in an axisymmetric shape, the position of the center point (intersection of the long axis and short axis) may be determined accurately. As a result, the deviation between the central axis of the tire 22 and the support rims 15, 21 can be accurately determined to accurately conduct the center alignment with the support rims 15, 21.

The reference numeral 94 denotes a processing means such as a microcomputer arranged on the floor face 12. Detection signals from encoders 95, 96, 97 detecting the rotations of the driving motors 26, 56, 67 and four photoelectric sensors 91 are input to the processing means 94, and positional information of the four photoelectric sensors 91 (e.g., values of the x and y coordinates) and the central axis of the support rims 15, 21 (values of the x and y coordinates, as well) is previously stored in the processing means 94.

The processing means 94 determines the position (e.g., values of the x and y coordinates) of the central axis of the tire 22 based on the stored positional information of the photoelectric sensors 91 at the time of the detection and the detected result from the photoelectric sensors 91 and encoders 96, 97 and also determines the deviations (deviations in the directions x and y axes) between the central axis of the tire 22 and the central axis of the support rims 15, 21. Then the matching signals corresponding to the deviations are output from the processing means 94 to the moving means 71, and more specifically to the driving motors 56, 67. In this connection, if the shape of the radial inner end of the bead portion 23 is deformed in an axisymmetric shape such as an ellipse, the central axis of the tire 22 is at an intersection of the long and short axes.

As a result, these driving motors 56, 67 are operated to move up/down and forward/backward the guide plate 74 and the tire 22 with the deviations (the amount corresponding to the matching signals), and the central axis of the tire is brought into agreement with the central axis of the support rims 15, 21. In this connection, when the radial inner end position of the bead portion 23 is to be detected by the photoelectric sensor 91 in the above-described manner, the tire 22 is moved in the plane perpendicular to the central axis of the tire 22 by means of the moving means 71. The moving means 71 is also used for the center alignment of the central axis of the tire 22 with the central axis of the support rims 15, 21. That is, the moving means 71 is used for both of the detection of the radial inner end position of the bead portion 23 and the center alignment of the two central axes. As a result, a special moving means for positional detection is not required, so that is configuration becomes simpler and its production cost becomes less expensive.

It is noted in the present invention that the deviations in the longitudinal and vertical directions may be calculated by the processing means without determining the position of the central axis of the tire and the moving means may be operated on the basis of the calculated deviations to conduct the center alignment of the central axis of the tire with the central axis of the support rims. Once the operation of the center alignment is finished in this manner, the tread rubber is removed from the tire 22 by means of the buffing means 34. This makes it possible to almost completely eliminate a center deviation between the support rims 15, 21 and the tire 22. Thus, especially when applied to a buffing machine 46, occurrences of heat separation, adhesion failure and vibration can be effectively suppressed.

In the next, operations of the above-mentioned embodiment will be discussed. It is assumed that the piston rod 14 of the cylinder 13 has been retracted to the stroke end, the support rim 15 has been moved to and stopped at the first side limit, and the guide plate 74 has been moved to the first side and stopped at a carry-in-and-out position where the guide plate 74 abuts the stopper 78 due to the biasing force of the spring 77. The tire 22 is carried between the support rims 15 and 21, and then placed, in the upright state, on the guide plate 74 at the carry-in-and-out position by a not-shown carrying means. In this state, the tire 22 is prevented from rotationally moving by the tire receiver 76, so that its position is not shifted. Also, the central axis of the tire 22 locates near the central axis of the support rims 15, 21 and the lights from the optical transmitters 82, 83, 87, 88 are blocked by the sidewall portion 81 of the tire 22.

Thereafter, a control signal is output from the processing means 94 to the driving motor 56 of the moving means 71 to rotate the screw shaft 54. This allows the elevating plate 50, moving plate 65, guide plate 74 and tire 22 to integrally move upward. During this moving, the upper side of the radial inner end (bead toe) of the bead portion 23 passes through and gets out of the path of the light from the optical transmitter 87. As a result, the light having blocked by the tire 22 is released from blocking to reach the optical receiver 89, and the radial inner end position of the tire 23 is detected at one point of the upper side. On this occasion, a detecting signal is output from the photoelectric sensor 91 consisting of the optical transmitter 87 and the optical receiver 89, and a detecting signal indicating the number of revolutions of the driving motor 56 (elevating distance of the tire 22) is output from the encoder 96.

The screw shaft 54 is then rotated in the direction opposite to the above-mentioned direction to move the tire 22 downward. During this moving, the lower side of the radial inner end of the bead portion 23 passes through the path of the light from the optical transmitter 87, and the light from the optical transmitter 87 reaches the optical receiver 90 to detect the radial inner end position of the bead portion 23 at one point of the lower side. At this occasion, a detecting signal from the photoelectric sensor 91 consisting of the optical transmitter 88 and the optical receiver 90 and a detecting signal from the encoder 96 are output to the processing means 94. After that, the guide plate 74 returns to the carrying-in-and-out position.

A control signal is then output from the processing means 94 to the driving motor 67 of the moving means 71 to rotate the screw shaft 68. This allows the tire 22 to move forward. During this moving, the front side of the radial inner end of the bead portion 23 passes through the path of the light from the optical transmitter 82 and the light from the optical transmitter 82 reaches the optical receiver 84 to detect the radial inner end position of the bead portion 23 at one point of the front side. On this occasion, a detecting signal from the photoelectric sensor 91 consisting of the optical transmitter 82 and the optical receiver 84 and a detecting signal from the encoder 94 is output to the processing means 94.

The screw shaft 68 is then rotated in the direction opposite to the above-mentioned direction to move the tire 22 backward. During this moving, the back side of the radial inner end of the bead portion 23 passes through the path of the light from the optical transmitter 83, and the light from the optical transmitter 83 reaches the optical receiver 85 to detect the radial inner end position of the bead portion 23 at one point of the back side. At this occasion, a detecting signal from the photoelectric sensor 91 consisting of the optical transmitter 83 and the optical receiver 85 and a detecting signal from the encoder 97 are output to the processing means 94. After that, the guide plate 74 returns to the carrying-in-and-out position. It is noted that the detection is not limited to the above-mentioned order but may have any order.

In this way, once the radial inner end position of the bead portion 23 is detected by the photoelectric sensor 91 at circumferentially spaced three or more points, e.g., four points spaced by an equal angle (90 degrees) in this embodiment, the processing means 94 calculates the position of the central axis of the tire 22 on the basis of the stored positional information of the photoelectric sensor 91 and the detected results from the photoelectric sensor 91 and encoders 96, 97. Next, the deviation between the central axis of the tire 22 and the central axis of the support rims 15, 21 is calculated, and a matching signal corresponding to the deviation is output to the moving means 71, more specifically the driving motors 56, 57.

The driving motors 56, 57 are operated upon receiving the matching signal from the processing means 94 to move up/down and forward/backward the tire 22 with the deviation (the amount corresponding to the matching signal), and the central axis of the tire 22 is brought into agreement with the central axis of the support rims 15, 21. In this connection, bringing the central axes into agreement means that the amount of the deviation between the central axes falls within an acceptable level and a complete agreement is not necessary. The bead portion 23 of the tire 22, which is an subject of the above-mentioned detection of the inner end position, is a portion where its dimension and shape are hardly changed even if the tire runs (i.e., is used) for a long time, so that the above-mentioned deviation can be determined at a high accuracy to, thereby, conduct a center alignment of the tire 22 with the support rims 15, 21 at a high accuracy. In this way, not the outer surface of the tread but the bead portion 23 is used for the center alignment. Thus, even if there is uneven wear, deformation, partial defect or the like on the tread, the effect can be eliminated.

In this way, after the alignment of the tire 22 with the support rims 15, 21 has been finished, the cylinder 13 is operated to project the piston rod 14, so that the support rim 15 is inserted in the bead portion 23 of the tire 22 at the first side. As a result, the beat portion 23 at the first side is seated on the support rim 15, and, even after that, the piston rod 14 is further projected. Meanwhile, the tire 22 moves along the guide rail 73 parallel to the central axis of the support rims 15, 21, so that the amount of the deviation between the central axis of the tire 22 and the central axis of the support rims 15, 21 is not increased and their concentricity can be kept high even when the tire is further moved to the other side.

Once the support rim 21 is inserted in the bead portion 23 of the tire 22 at the other side and the bead portion 23 is seated on the support rim 21, the operation of the cylinder 13 is halted. After bead portions 23 of the tire 22 is seated on and supported by the support rims 15, 21 in this way, internal pressure (air) of low pressure, e.g., at about 0.2 MPa is filled into the tire 22 and the driving motor 56 is operated to rotate the screw shaft 54. This allows the elevating plate 50, moving plate 65 and guide plate 74 to move downward to release the tire 22. After that, while the support rims 15, 21 and the tire 22 are integrally rotated by the rotating means 31, the buffing rotation body 45 and the buffing body 40 are moved together along the outer surface of the tire 22 as well as the buffing rotation body 45 is rotated. Accordingly, the tread rubber is removed from the tire to give a base tire.

In the above-described embodiment, the photoelectric sensor 91 stands still and the tire 22 moves upward/downward and forward/backward, so that the radial inner end position of the bead portion 23 is detected at four points which are circumferentially separated by an equal angle. However, the tire may stand still and the detecting means may move in a plane perpendicular to the central axis of the tire, so that the radial inner end position of the bead portion 23 is detected at circumferentially separated at least three points. The above-described embodiment applies the present invention to the buffing machine 46, but the present invention may also be applied to a uniformity machine, apparatus for measuring the outer diameter of a tire and apparatus for retreading a tire in which a new tread is attached on the radially outside of a base tire.

INDUSTRIAL APPLICABILITY

The present invention is applicable to an industrial field of center alignment of a tire with a pair of support rims.

The invention claimed is:

1. A method for coaxially aligning a tire with support rims, comprising the steps of: detecting a position of a radial inner end of a bead portion of the tire with a detecting means at three or more points separated in the circumferential direction; calculating a positional difference between a central axis of the tire and a central axis of a pair of support rims movable in mutually approaching and receding directions by a processing means on the basis of positional information of the detecting means and a result from the detecting means at the detecting step; and aligning the central axis of the tire with the central axis of the support rims by operating a moving means upon receiving a matching signal from the processing means to move the tire through a distance equal to the calculated positional difference.

2. The method for coaxially aligning a tire with support rims according to claim 1, wherein the position of the radial inner end of the bead portion is detected by the detecting means at four points circumferentially spaced by 90 degrees.

3. An apparatus for coaxially aligning a tire with support rims, comprising: a detecting means for detecting a position of a radial inner end of a bead portion of the tire at least at three points separated in the circumferential direction; a processing means for calculating a positional difference between a central axis of the tire and a central axis of a pair of support rims movable in mutually approaching and receding directions on the basis of positional information of the detecting means and a result from the detecting means at the detection; and a moving means for aligning the central axis of the tire with the central axis of the support rims operable upon receiving a matching signal from the processing means to move the tire through a distance equal to the calculated positional difference.

4. The apparatus for coaxially aligning a tire with support rims according to claim 3, wherein the same number of detecting means as the positions of the radial inner end of the bead portion to be detected are provided.

5. The apparatus for coaxially aligning a tire with support rims according to claim 3, wherein the tire is moved in a plane perpendicular to the central axis of the tire by the moving means when the position of the radial inner end of the bead is to be detected.

6. The apparatus for coaxially aligning a tire with support rims according to claim 3, wherein the tire is a used tire subjected to be retreaded, and the apparatus is applied to a buffing machine for removing a tread rubber from the used tire.

7. The apparatus for coaxially aligning a tire with support rims according to claim 4, wherein the tire is moved in a plane perpendicular to the central axis of the tire by the moving means when the position of the radial inner end of the bead is to be detected.

8. apparatus for coaxially aligning a tire with support rims according to claim 4, wherein the tire is a used tire subjected to be retreaded, and the apparatus is applied to a buffing machine for removing a tread rubber from the used tire.

9. The apparatus for coaxially aligning a tire with support rims according to claim 5, wherein the tire is a used tire subjected to be retreaded, and the apparatus is applied to a buffing machine for removing a tread rubber from the used tire.

10. The apparatus for coaxially aligning a tire with support rims according to claim 7, wherein the tire is a used tire subjected to be retreaded, and the apparatus is applied to a buffing machine for removing a tread rubber from the used tire.

* * * * *